US011687355B1

(12) United States Patent
Mukherjee et al.

(10) Patent No.: US 11,687,355 B1
(45) Date of Patent: Jun. 27, 2023

(54) METHODS TO EXTRACT CLOUD INFRASTRUCTURE REQUIREMENTS FROM VIRTUALIZED APPLICATIONS AND AUTODEPLOY

(71) Applicant: Cisco Technology, Inc., San Jose, CA (US)

(72) Inventors: Arghya Mukherjee, Acton, MA (US); Fei Gao, Kawasaki (JP); Ahmad Said Farid, Meguro (JP); Om Prakash Suthar, Bolingbrook, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/003,188

(22) Filed: Aug. 26, 2020

Related U.S. Application Data

(60) Provisional application No. 63/000,023, filed on Mar. 26, 2020.

(51) Int. Cl.
*G06F 9/455* (2018.01)
*H04L 41/0806* (2022.01)
*H04L 41/0816* (2022.01)
*H04L 67/10* (2022.01)

(52) U.S. Cl.
CPC ...... *G06F 9/45558* (2013.01); *H04L 41/0806* (2013.01); *H04L 41/0816* (2013.01); *H04L 67/10* (2013.01); *G06F 2009/4557* (2013.01); *G06F 2009/45595* (2013.01)

(58) Field of Classification Search
CPC ......... G06F 9/45558; G06F 2009/4557; G06F 2009/45595; H04L 41/0816; H04L 67/10; H04L 41/0806
USPC ......................................................... 709/221
See application file for complete search history.

(56) References Cited

U.S. PATENT DOCUMENTS

2016/0057102 A1* 2/2016 Wei ..................... H04L 61/2007 709/226
2017/0006083 A1* 1/2017 McDonnell ......... H04L 67/1097
2018/0121227 A1* 5/2018 Peng ................... G06F 9/45558
2018/0183855 A1* 6/2018 Sabella ................... G06F 9/505
2018/0205637 A1* 7/2018 Li ....................... H04L 41/5058
2018/0375726 A1* 12/2018 Xia ......................... H04L 12/46
2019/0050248 A1* 2/2019 Oohira .................. G06F 9/5044
2019/0089780 A1* 3/2019 Yousaf ................ G06F 9/45533
(Continued)

FOREIGN PATENT DOCUMENTS

EP 2849064 A1 * 3/2015 ......... G06F 9/45558

OTHER PUBLICATIONS

ONAP, "ONAP VoLTE Use Case Blueprint Overview," https://www.onap.org/wp-content/uploads/sites/20/2018/06/ONAP_CaseSolution_VoLTE_0618FNL.pdf, Jun. 2018, 9 pages.
(Continued)

*Primary Examiner* — Mohamed A. Wasel
*Assistant Examiner* — Tesfu N Mekonen
(74) *Attorney, Agent, or Firm* — Edell, Shapiro & Finnan, LLC

(57) ABSTRACT

A system and method are provided to derive Virtual Network Function (VNF) infrastructure and networking requirements from the virtual network function descriptor and network services descriptor definitions (extended). This results in a fully automated system for VIM creation and VNF onboarding in order to prepare the infrastructure for VNF instantiation.

20 Claims, 8 Drawing Sheets

(56) References Cited

U.S. PATENT DOCUMENTS

| | | | | |
|---|---|---|---|---|
| 2019/0140921 | A1* | 5/2019 | Xu | H04L 41/5012 |
| 2020/0412596 | A1* | 12/2020 | Cherunni | G06F 9/5077 |
| 2021/0218798 | A1* | 7/2021 | Jethanandani | H04L 67/1002 |

OTHER PUBLICATIONS

ONAP, "ONAP 5G Blueprint Overview," https://www.onap.org/wp-content/uploads/sites/20/2018/11/ONAP_CaseSolution_5G_112118FNL.pdf, Nov. 2018, 10 pages.

OPNFV, "POD Descriptor," https://wiki.opnfv.org/display/INF/POD+Descriptor, Mar. 2018, 2 pages.

OPNFV, "POD Descriptor File 1.0," PowerPoint Presentation, https://wiki.opnfv.org > download > OPNFV_PDF_v1.0_28_Feb_2018.pptx, Feb. 2018, 12 pages.

Confluence, "Service Design & Creation," May 2017, 6 pages.

ETSI, "Network Functions Virtualisation (NFV) Release 2; Protocols and Data Models; VNF Package specification," Group Specification, ETSI GS NFV-SOL 004 V2.5.1, Sep. 2018, 21 pages.

ETSI, "Network Functions Virtualisation (NFV) Release 2; Protocols and Data Models; NFV descriptors based on TOSCA specification," Group Specification, ETSI GS NFV-SOL 001 V2.5.1, Dec. 2018, 205 pages.

ETSI, "Network Functions Virtualisation (NFV); Management and Orchestration," Group Specification, ETSI GS NFV-MAN 001 V1.1.1, Dec. 2014, 184 pages.

* cited by examiner

METHODS TO EXTRACT CLOUD INFRASTRUCTURE REQUIREMENTS FROM VIRTUALIZED APPLICATIONS AND AUTODEPLOY

CROSS REFERENCE TO RELATED APPLICATION

This application claims priority to U.S. Provisional Application No. 63/000,023, filed Mar. 26, 2020, the entirety of which is incorporated herein by reference.

TECHNICAL FIELD

The present disclosure relates to computing environments for mobile core networks.

BACKGROUND

Service providers need fully automated TelcoCloud deployments to optimize total cost of ownership (TCO). TelcoCloud applications (such as virtual Radio Access Network (vRAN), User Plane Function (UPF)) have specific requirements. The required resources in a Virtualized Infrastructure Manager (VIM) Point of Delivery (POD), such as compute resources, storage resources, networking resources, cabling (type/numbers), virtual Network Interface Cards (vNICs), Smart NICs (sNICs) etc., need to be derived from virtualized applications (Virtual Network Functions (VNFs), Cloud-Native Network Function (CNF)) that are running on the POD. These applications also often use specialized hardware configurations and sizing based on application requirements. Currently, the system that can characterize VNF/CNF requirements and dimension resources and pre-position Network Function Virtualization Infrastructure (NFVI) and VIMs based on workloads is manual and highly error prone.

DESCRIPTION OF EXAMPLE EMBODIMENTS

Overview

Briefly, a system and method are provided to derive VNF infrastructure and networking requirements from the virtual network function descriptor and network services descriptor definitions (extended). This results in a fully automated system for VIM infrastructure creations and VNF onboarding—to prepare the infrastructure for VNF instantiation.

In one embodiment, a method is provided that includes operations performed by an orchestration entity configured to instantiate one or more virtual network functions in a cloud computing infrastructure that includes compute resources and storage resources. The method includes obtaining a virtual network function descriptor file that describes parameters of a virtual network function to be instantiated in the cloud computing infrastructure, and a network services descriptor file that defines networking parameters to be supported in the cloud computing infrastructure, wherein the virtual network function descriptor file includes vendor-specific enhanced resource information associated with one or more configurations of the compute resources and/or storage resources. The method further includes creating, based on the virtual network function descriptor file and the network services descriptor file, artifacts that are referenced when instantiating the virtual network function, the artifacts including an aggregation of servers corresponding to a virtual network capacity, virtual machine images, and network configurations. Finally, the method includes instantiating the virtual network function on a Point of Delivery (POD) in the cloud computing infrastructure, based on the artifacts.

Example Embodiments

Figure 1:
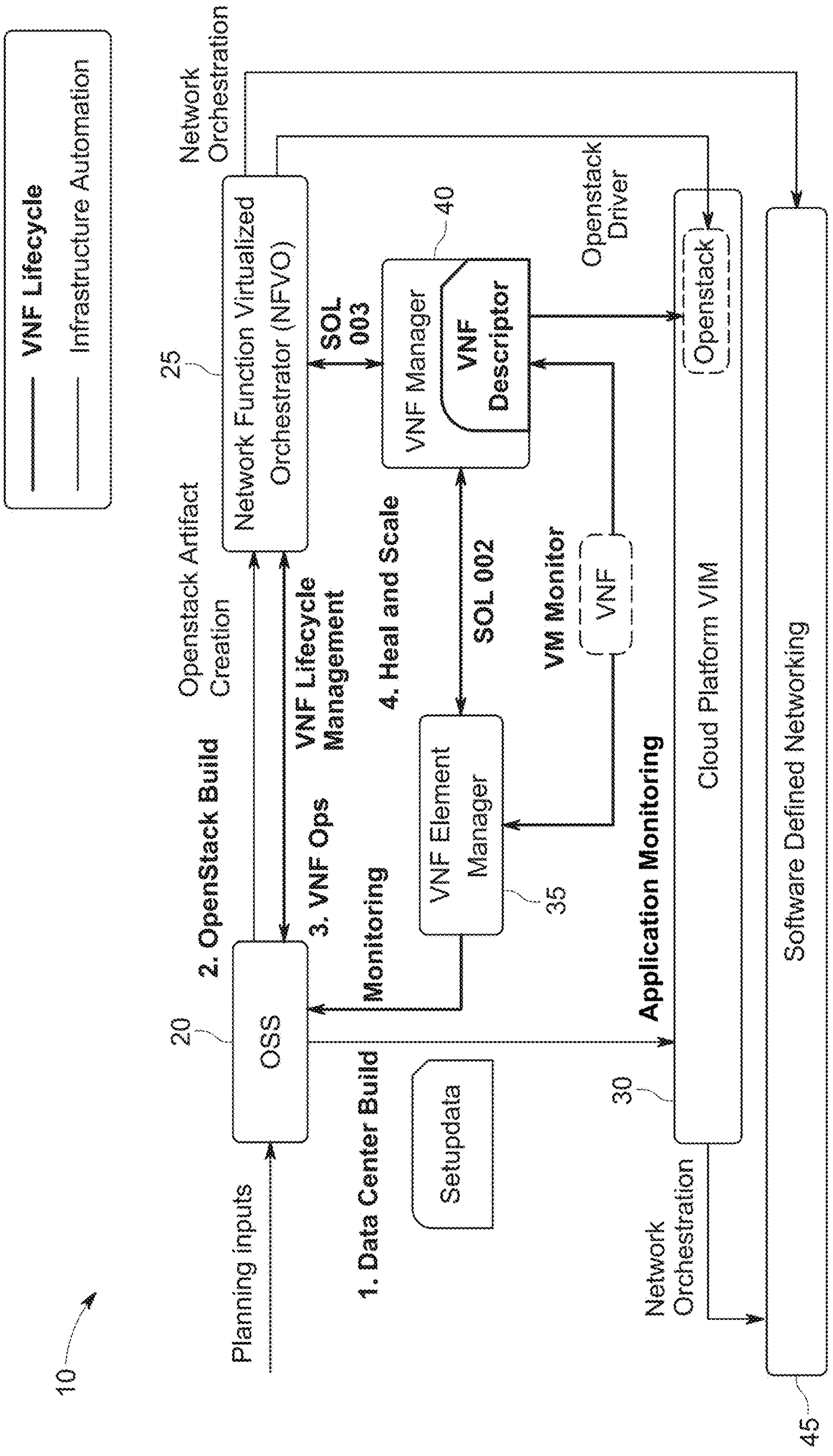
FIG. 1 is a block diagram depicting a functional architecture of a virtualized infrastructure environment useful in a mobile services network, in which the techniques presented herein may be deployed, according to an example embodiment.

FIG. 1 shows a system build process currently followed for an Openstack™ POD and its adjacent network components to host a specific VNF workload. The system 10 shown in FIG. 1 includes an Operation Support Systems (OSS) entity 20, an Network Function Virtualized Orchestrator (NFVO) 25, a cloud monitoring platform virtual infrastructure manager (VIM) 30, a VNF element manager 35, a VNF manager 40 and a software defined networking layer 45. The NFVO 25 and VNF Manager may use European Telecommunications Standards Institute (ETSI) SOL.001 based Virtual Network Function Descriptor (VNFD) that specifies some of the requirements the cloud infrastructure needs to provide.

The operational flow is depicted by the steps enumerated in FIG. 1. Of note is that the planning inputs are provided by application owners in a defined format that is accepted as input to OSS 20. For a multi-vendor environment and a complex VNF, if the information is provided manually then the process can be quite error prone.

Figure 2:
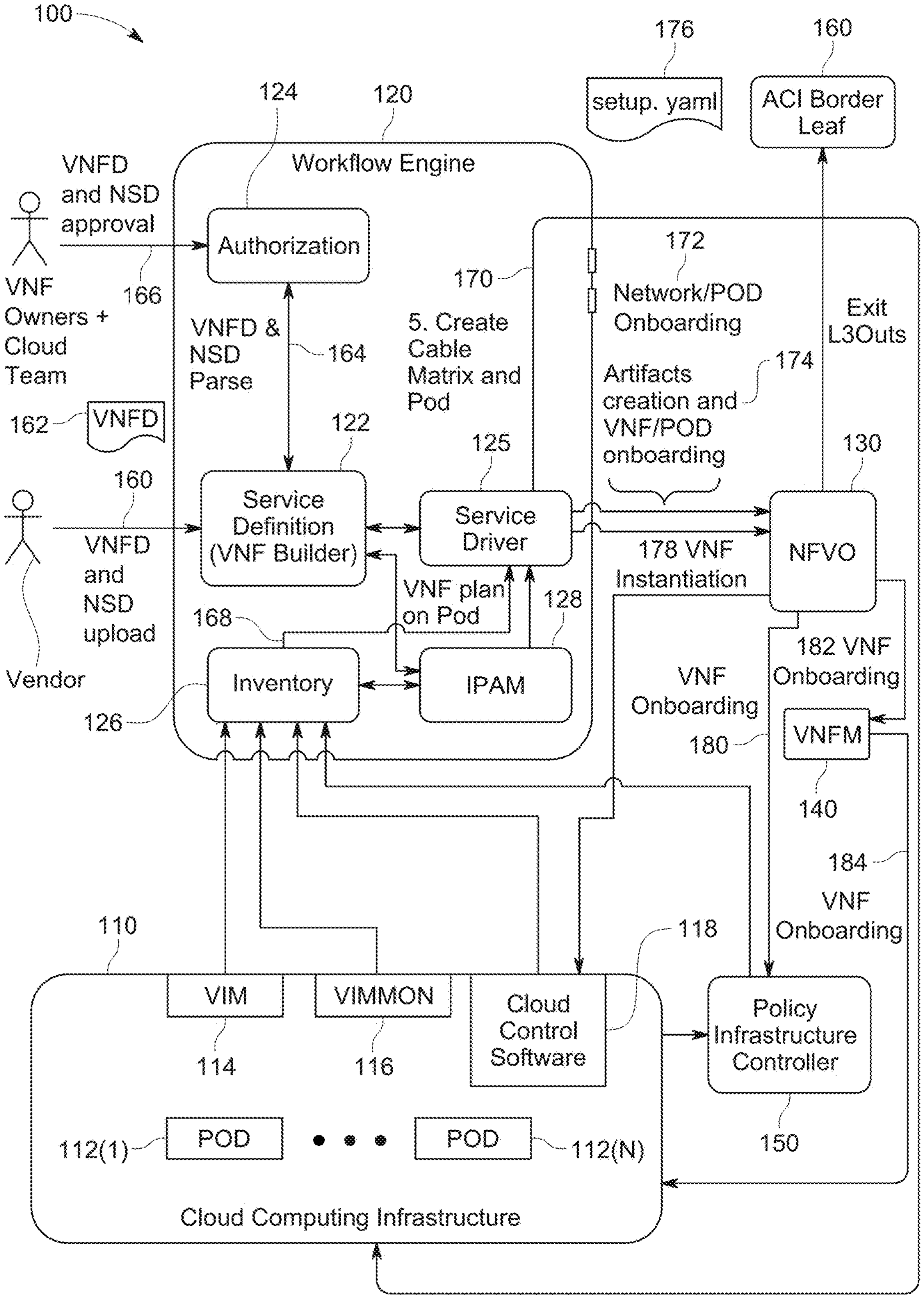
FIG. 2 is a functional diagram depicting aspects of the solution presented herein, according to an example embodiment.

A much more robust solution is one which automates the process to configure the cloud infrastructure based on the configurations and requirements of VNFs to be deployed in the cloud infrastructure. Reference is now made to FIG. 2, which shows a system 100 that includes a cloud computing infrastructure 110, a workflow engine 120, an NFVO 130, a VNFM 140, a policy infrastructure controller 150 and an Application Centric Infrastructure (ACI) border leaf node 160.

The cloud computing infrastructure 110 includes one or more PODs 112(1)-112(N), each of which includes compute resources, storage resources, networking resources, etc. For purposes of monitoring and control, the cloud computing infrastructure 110 further includes a VIM 114, a VIM Monitor (VIMMON) 116 and cloud control software 118. In one form, the cloud control software 118 is the Openstack™ cloud control software.

The workflow engine 120 includes various functions and modules that are used as part of the VNF deployment process presented herein. Specifically, the workflow engine 120 includes a service definition (VNF builder) function 122, an authorization function 124, a service driver function 125, an inventory 126 and an IP address manager (IPAM) 128.

As explained above, a VNF is a software application and the cloud computing infrastructure 110 is the hardware platform on which the VNF is to be deployed. The cloud infrastructure requirements of the VNF are stitched with the VNF itself. Accordingly, a method is presented herein involve extracting cloud infrastructure requirements from the VNF. When deploying a VNF, the cloud infrastructure is most typically already deployed. This method coordinates the cloud infrastructure parameters of a VNF that need to be configured on the cloud infrastructure, i.e., on one or more of the PODs 112(1)-112(N) of the cloud computing infrastructure 110.

Still referring to FIG. 2, the method is as follows.

At 160, a vendor creates and submits the extended VNFD file (shown at 162) and Network Service Descriptor (NSD) based on extensions to the ETSI SOL.001 specifications. The NSD in this context contains information that is used by the infrastructure (VIM, Openstack, networking) to be able to support the application. The NSD defines the network functionality for the VNF and the VNFD describes the VNF parameters. The VNFD file may be provided by a vendor or by the cloud provider. The two files (the VNFD file and the NSD file) are automatically provided into the system through the workflow engine 120.

At 164, the service definition function 122 parses the VNFD and NSD, and stores the infrastructure template information in an intermediate form. It then triggers the next step.

At 166, a representative from the network operator then approves the infrastructure request. This may involve multiple steps based on the authorization flow of the specific network operator. This is shown by the authorization function 124 in FIG. 2. The authorization function 164 validates the VNFD validated according to its service definition, such as a Voice VNF or a Packet Core VNF. This helps define the boundary (minimums and maximums) for certain VNF parameters according to the particular VNF being defined in the service definition.

At 168, after VNF validation, the VNF installation is planned for a specific POD; in some cases, this may be several VNFs together. At this point, inventory is consulted by the service definition function 122, as well as the IPAM 128 to assign network ranges and virtual local area network (VLAN) identifiers (IDs). The inventory function 126 includes information about the hardware and software as well as certain configurations from the cloud computing infrastructure 110.

The VIM 114, VIMMON 116 and cloud control software 118 report to the inventory function 126 information about resources (compute, storage, networking etc.) in the cloud computing infrastructure 110, and how much of these resources remain available. The IPAM 128 contains layer 2 and layer 3 information for VNF deployment, and in particular information about how many IP (IPv4 and/or IPv6) addresses are used and how many are available.

The addresses used for the VNFs may include IP addresses allocated for a management IP address, and service IP address, and traffic plane IP addresses. When a VNF is to be deployed in one or more of several data centers, and each data center will have a pool of IP addresses. The VNF can be automatically and dynamically be deployed and the method presented herein includes a mechanism that can pick up an IP address set for a VNF for all of the locations where that VNF is deployed.

At 170, a cable matrix and rack diagram is generated, and used as input for the POD that is physically built (racked, stacked, and cabled) in the cloud computing infrastructure 110 (datacenter). There are two possibilities for this. The first is when the POD on which the VNF is to be deployed has not already been built, and the second is when a POD has already been built but it needs to be modified to support the new VNF to be deployed. For the situation where a new POD is being built, the method presented herein involves building the POD taking into account the parameters for the VNF(s) to be deployed on the POD. Once the cable matrix is created for a POD, the POD is instantiated automatically, with the specific network and server specifications for the applications being reflected in the build. This includes single-root input/output virtualization (SRIOV) specifications, VLAN creation, Layer 3 (L3Out) creation, server specifications such as HugePages, central processor unit (CPU) pinning, hyperthreading, etc. HugePages is a feature integrated into the Linux kernel 2.6. HugePages allows the operating system to support memory pages greater than the default (usually 4 KB). HugePage sizes vary from 2 MB to 256 MB, depending on the kernel version and the hardware architecture.

Topology and Orchestration Specification for Cloud Applications (TOSCA), is an OASIS standard language to describe a topology of cloud-based web services, their components, relationships, and the processes that manage them. The TOSCA standard includes specifications to describe processes that create or modify web services.

There are specific application configuration needs that applications have on the hypervisor and kernel used by one or more PODs 112(1)-112(N) in the cloud computing infrastructure 110. The VIM 114 configures the hypervisor used by the cloud, etc. According to embodiments presented herein, information about these specific application configuration needs are included in the VNFD file 162 so that the information can be digested and created as a configuration on a server for a VNF.

Thus, the VNFD 162 includes vendor-specific enhanced resource information that describe specific application configuration needs of compute resources and/or storage resources of the cloud computing infrastructure 110. This is added to the VNFD, as part of an existing datatype called virtual CPU (vCPU). For example, the type definitions included in the VNFD 162 may include specification of requirements related to support for allocation of larger non-standard pages of memory (i.e., HugePages), hyperthreading and/or hardware extensions to support hardware acceleration capabilities.

For HugePage, a new TOSCA data type is created: tosca.datatype.nfv.HugePage, extending an existing root datatype (tosca.datatypes.Root). HugePage is a type of virtual memory that is allocated to a process (vCPU) in chunks. Each chunk is a page. An operating system (OS) OS allocates memory in chunks. Default Pages were originally defined (many years ago) and were much smaller. For a new and more complex VNF, it is useful to define a much larger page (larger than a standard Linux page size). Allocated memory in much larger chunks is achieved with HugePage. This speeds up performance because it is not necessary to do multiple requests for memory. A larger chunk of memory can be accessed in one request. Telecommunication applications have higher memory and CPU requirements and tend to use a lot of memory and thus need benefit from the use of HugePage.

For hardware_extensions, a predetermined type may be used, called "map". A collection of performed key-value pairs is denoted by "map". Different field programmable gate array (FPGA) and graphic processor unit (GPU) types may use what is denoted in the "map".

Hyperthreading is a Boolean type (either yes or no). There is no need to create a new type for it.

Examples of such extensions to the type definitions included in the VNFD 162 are set forth below.

tosca.datatypes.nfv.VirtualCpu:
derived_from: tosca.datatypes.Root
[S1] huge_page_requirement:
  type: tosca.datatypes.nfv.HugePage
  description: Definition of huge pages
  required: false
[S2] hyperthreading:
  type: boolean
  description: Hyperthreading support required
  required: false
[S3] hw_extensions:
  type: map
  description: Requirements of FPGA and GPU support The new types are:

tosca.datatypes.nfv.HugePage:
derived_from: tosca.datatypes.Root
description: Definition of huge pages
properties:
[S1.1] huge_page_size:
  type: integer
  description: size in MB
  required: false
[S1.2] huge_page_percentage:
  type: integer
  description: Percentage of huge pages reserved
  constraints:
  -valid_range: [0, 100]
  required: false The capacity metrics may be derived from these new types as:

derived_from: tosca.datatypes.Root
description: Capacity of a VNF
properties:
[S4.1] metric_name:
  type: string
  description: Name of Metric for sizing
  required: true
[S4.2] metric_value:
  type: string
  description: value of metric for sizing
  required: true
[S4.3] metric_type:
  type: string
  description: type of metric to be applied to value
  required: true
[S4.4] metric_units:
  Type: string
  Description: units to be used for value
  required: true Example of the data outputs that result from these new types are as follows.

VIM Configuration (Per Server):

[O1.1] VM_SIZE: 1G # derived from [S1] directly by calculating the size in GB from MB

[O1.2] VM_HUGEPAGE_PERCENTAGE: 75 # derived from [S1.2] directly

[O3] INTEL_FPGA_VFS: 2 # derived from [S3]—any variable with Prefix "VIM" is transferred after stripping the prefix—so "VIM:INTEL_FPGA_VFS:2" becomes this value.

[O2] DISABLE HYPERTHREADING: false # derived from [S2]—opposite of value in [S2]—so "hyperthreading: true" is transferred as "DISABLE_HYPERTHREADING: false"

An OpenStack configuration may take the form of:

[O4] Aggregate definition: (number of servers) derived based on maximum number of VNFs according to total capacity required divided by each capacity metric.

[S4.2] Determine the total number of servers based on the number of VNFs required.

The VNFD file 162 may also define the size of a VNF, denoted Per-VNF capacity metric. Per-VNF capacity refers to how many processes (users) a VNF can handle. It is represented by a number plus units. When the vendor specifies a per-VNF capacity, it is a rated capacity, and is used to determine the number of VNFs and thus how many servers are needed to support a certain aggregate capacity. Using this information, the configuration of the cloud computing infrastructure happens in an automated manner.

There are advantages achieved by including HugePage, hyperthreading and hardware extensions in the VNFD file 162. This allows automatic extraction of this information into the setup.yaml file that the VIM 114 uses. Without doing this, it would be necessary to communicate with the application provider and inquire about these specifications and manually add them into the setup.yaml file. Unlike other prior techniques, the embodiments presented herein use the VNFD for the pre-staging of infrastructure for the VNFs.

The VIM 114 uses the setup.yaml file to deploy software on computes resources to form a POD. The setup.yaml file contains parameters, such as description for controller nodes, storage nodes, Nova nodes, networking parameters, image name and configuration, security parameters, horizon graphical user interface (GUI) parameters etc.

Moreover, the processes presented herein use the VNFD to automate the VNF instantiation process, and any gaps in the VNFD that are needed, are automatically determined. Various information elements are derived from the VNFD and NSD. These two input files are either built manually or can be auto-generated based on input parameters.

Again, an advantage of this is that the VIM 114 does not need to go out and contact the application providers, but rather it is included in the VNFD and is automatically obtained from the VNFD file 162 and acted on accordingly to build a POD, or reconfigure an existing POD.

Referring back to FIG. 2, if a POD is already built, and there is a need to instantiate certain VNFs on it for which the POD was not specifically built, then the VNF planning operation 168 for that POD. This would involve modifying current characteristics (e.g., hypervisor) of the POD, as needed for the new VNFs to be installed on it.

At 172, the service driver 125 performs POD onboarding of network aspects for the VNF POD. At 174, the service driver 125 creates VNF artifacts and on-boards them the POD for the VNF.

Operation 174 is described in more detail. The method involves creating artifacts corresponding to the VNFs, including aggregating servers corresponding to the VNF capacity required, as specified in the NSD, such as images, networks, quotas, etc. Since the build step is derived from the same information, this step removes any errors of manual transcription. The set of artifacts and the mechanism by which the VIM configuration is done is important. This is normally done manually by referring to data in spreadsheets, after asking application providers what is needed for POD configuration. The mechanism presented herein involves tying a set of application (VNF) specifications and using that to influence the physical build and install of the hypervisor that supports the VNF(s). In other words, the method involves tying the infrastructure configuration to the application specification. New parameters are employed in the following steps, as described below.

Artifacts are a set of entities that are needed to bring up a VNF, such as a VM image is used to instantiate the VM. The artifact creation relates to what was done on the physical POD building step. The image has to be known to that instance of the cloud control software 118, such as Openstack. For example, in Openstack, a set of "networks" is aligned with the VM and that is defined/included in the artifacts. As another example, an artifact may include the "aggregate of servers" which are those servers identified for on which the VM is allowed to come up. All of these are Openstack or virtualized VIM-based entities that are used when creating a VM because the VM is going to use all of them.

As a further example, when bringing up a VNF on an Openstack instance, the method involves creating the artifacts that will be referenced, and then the method initiates a command to create the VM that references these artifacts. Once that has been done for an Openstack instance, that same set of artifacts may be used to bring up other instances of a type of VNF. All the instances could be created referencing/using the same set of artifacts. Thus, the pre-staging can be done only once for a particular VNF type.

The setup.yaml file 176, which goes to the VIM 114, is synchronized with the artifact creation. YAML (Ain't Markup Language) is a human-readable data-serialization language. It is commonly used for configuration files and in applications where data is being stored or transmitted. YAML targets many of the same communications applications as Extensible Markup Language (XML). The same VNFD is used for OpenStack artifact creation as well as network and POD onboarding.

After operations 172 and 174, the service driver 125 sends a command 178 to the NFVO 130 to cause VNF instantiation. This results in the NFVO 130 sending a command/request 180 to the cloud control software 118 for VNF onboarding and a command/request 182 to the VNFM 140, which in turn communicates, at 184, to the cloud computing infrastructure 110 to cause VNF instantiation. Operations 180, 182 and 184 may be performed in accordance with VNF instantiation flow as described in the ETSI Management and Orchestration (MANO) specifications.

Figure 3A:
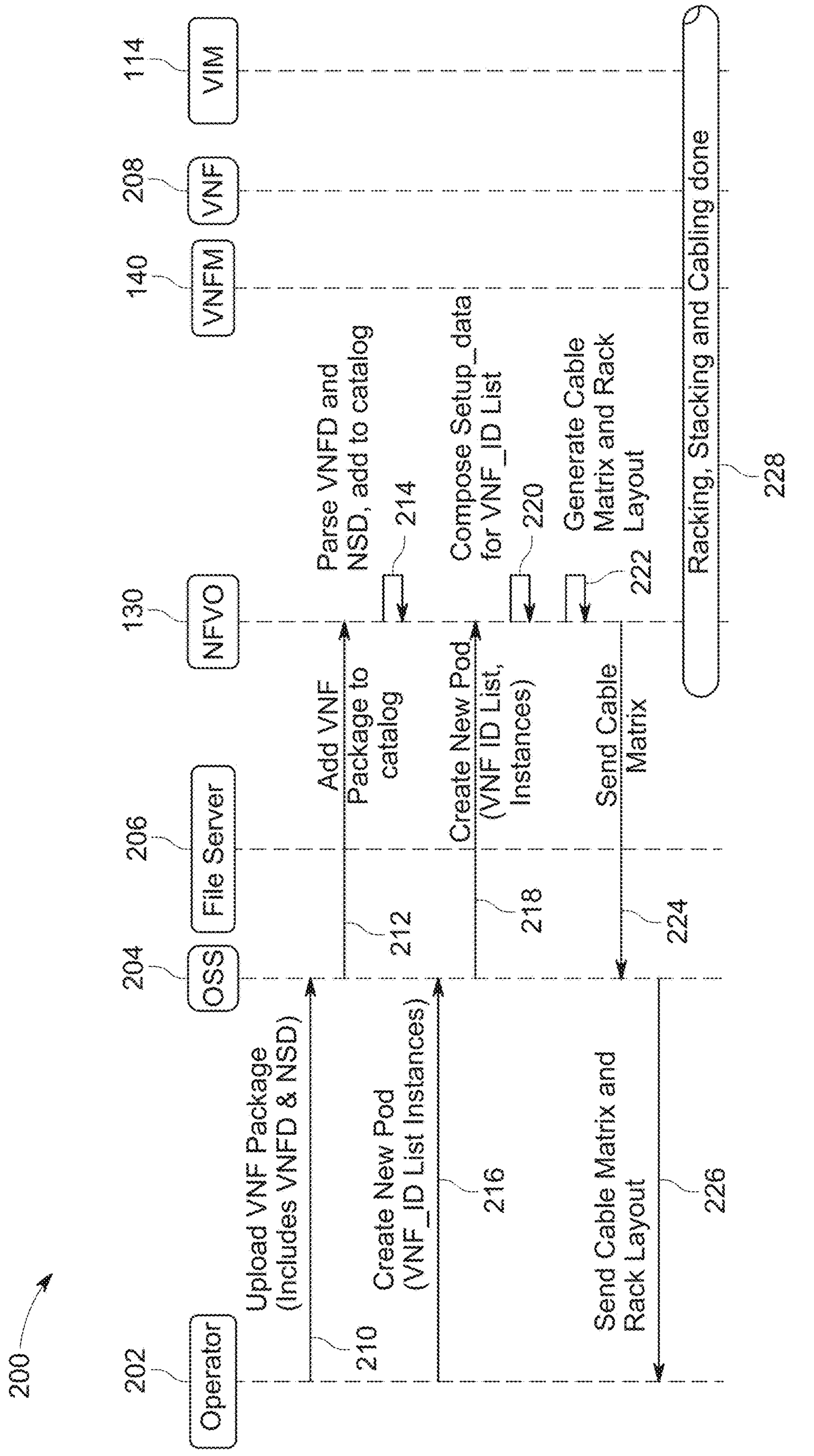
FIGS. 3A and 3B illustrate depicting a process for configuring cloud infrastructure resources to build a Point of Delivery (POD) entity on which to instantiate a virtual network function, according to an example embodiment.
Figure 3B:
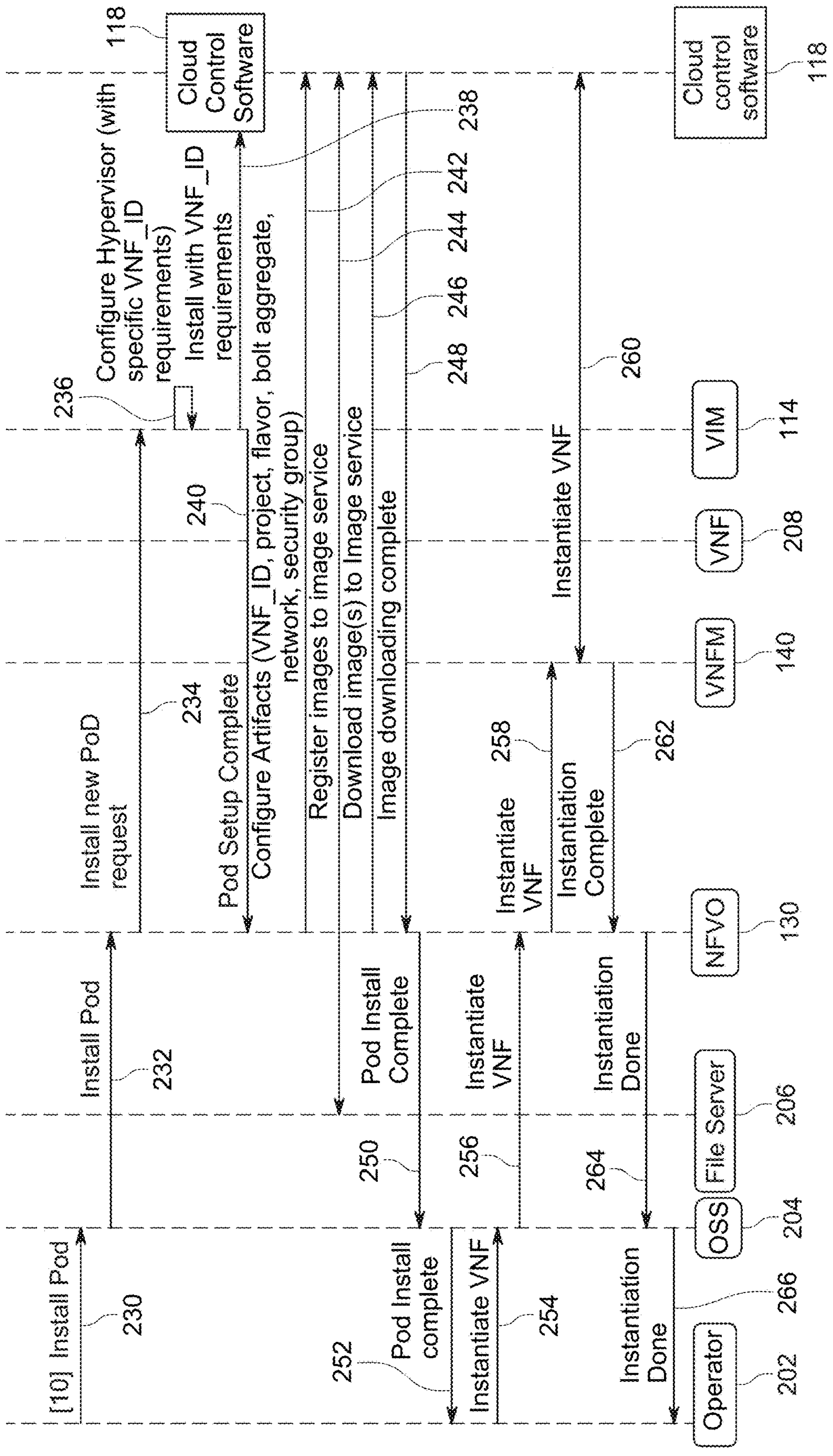

Reference is now made to FIGS. 3A and 3B. FIGS. 3A and 3B depict a call-flow for a process 200 to translate VNF build requirements into a VIM deployment, in accordance with embodiments presented herein, and for creating a new POD on which a VNF is to be deployed. The entities involved are a system operator 202, an OSS 204, a file server 206, NFVO 130, a VNF 208 to be deployed, VNFM 140 and VIM 114.

At 210, the operator 202 uploads to the OSS 204 the VNF package that includes the NSD file and VNFD file. At 212, the OSS 204 sends an add request, with the VNF package, to the NFVO 130, requesting the NFVO 130 to add that VNF package into the catalog. At 214, the NFVO parses the VNFD file and the NSD file and adds them into the catalog.

Next, at 216, the operator 202, provides to the OSS 204, a request to create a new POD. This request includes a VNF_ID list and VNF instances.

At 218, the OSS 204 sends the VNF_ID list to the NFVO 130 for creating POD information for the new POD. At 220, the NFVO 130 looks up the VNF_ID in the VNF_ID list and finds the VNFD and NSD for each VNF_ID. Then, the NFVO 130 generates setup data based on the VNFD and NSD information for all the VNF_IDs in the VNF_ID list. At 222, the NFVO 130 generates cable matrix and rack layout data based on the information of all the VNF_IDs in the VNF_ID list. At 224, the NFVO 130 sends the generated cable matrix and rack layout data back to the OSS 204. At 226, the OSS 204 sends the cable matrix and rack layout data to the operator 202. Racking, stacking and cabling in the POD is performed at 228.

Turning now to FIG. 3B, the description of the process 200 continues. At 230, the operator 202 causes the OSS 204 to trigger POD installation. At 232, the OSS 204 sends a POD installation request to the NFVO 130. At 234, the NFVO 130 looks up the POD ID and finds the setup_data for the POD, and then sends a request with the setup_data information to VIM 114.

At 236, the VIM 114 starts hypervisor configuration based on the request and the setup_data containing the VNF_ID requirements. The VIM 114, at 238, then sends to the cloud control software 118, a command that starts a cloud installation based on the request and setup_data.

At 240, the VIM 114 notifies the NFVO 130 that the POD setup is complete, that is, that installation by the cloud control software 118 has completed.

The NFVO 130, then at 242, NFVO looks up, based on a POD ID, and finds artifacts needs (e.g., OpenStack artifacts) to be on-boarded for that POD and then starts artifacts configuration (project, quota, user, network, subnet, flavor, host aggregate, security group) on by the cloud control software 118. At 244, the NFVO 130 sends an image registration request with an image name and Universal Resource Locator (URL) to an Image service of the cloud control software 118, e.g., the Glance service of OpenStack. The Image service enables users to discover, register, and retrieve virtual machine images. The Image service accepts requests for disk or server images, and metadata definitions from end users or compute components.

The Image service of the cloud control software 118, at 246 downloads image(s) from the URL and registers it/them into the Image service using the image name given by NFVO 130. The NFVO, at 348, detects image registration completion.

The NFVO, 130 at 250, notifies the OSS 204 that POD installation is complete. At 252, the OSS 204 informs operator that POD installation is complete.

At 254, the operator operates the OSS 204 to instantiate a VNF. The OSS 204 sends a VNF instantiation request with instantiation payload to the NFVO 130, at 256. The NFVO 130 sends the VNF instantiation request and instantiation payload to VNFM 140, at 258. At 260, the VNFM 140 sends the VNF instantiation requests to the cloud control software 118.

The VNFM 140 detects VNF instantiation completion and notifies the same to the NFVO 130, at 262. At 264, the NFVO 130 notifies the OSS 204 that VNF instantiation is complete, and at 266, the OSS 204 notifies the operator that VNF instantiation is complete.

To summarize, in the process 200, operations 210-214 involve the system taking in and parsing the VNFD and NSD associated with a VNF to be deployed in the cloud computing infrastructure 110, and operations 216-228 involve setting up a new POD for the VNF. Operations 230-240 involve setting up the new POD in the cloud computing infrastructure 110, configured with the appropriate requirements for the VNF. Operations 242-252 involve the interaction between the NFVO 130 and the cloud control software 118 to register and download the image and artifacts for the VNF, as determined from the VNFD and NSD. Operations 254-266 involve instantiating the VNF in the cloud computing infrastructure 110 once the POD has been installed and image downloaded.

Figure 4A:
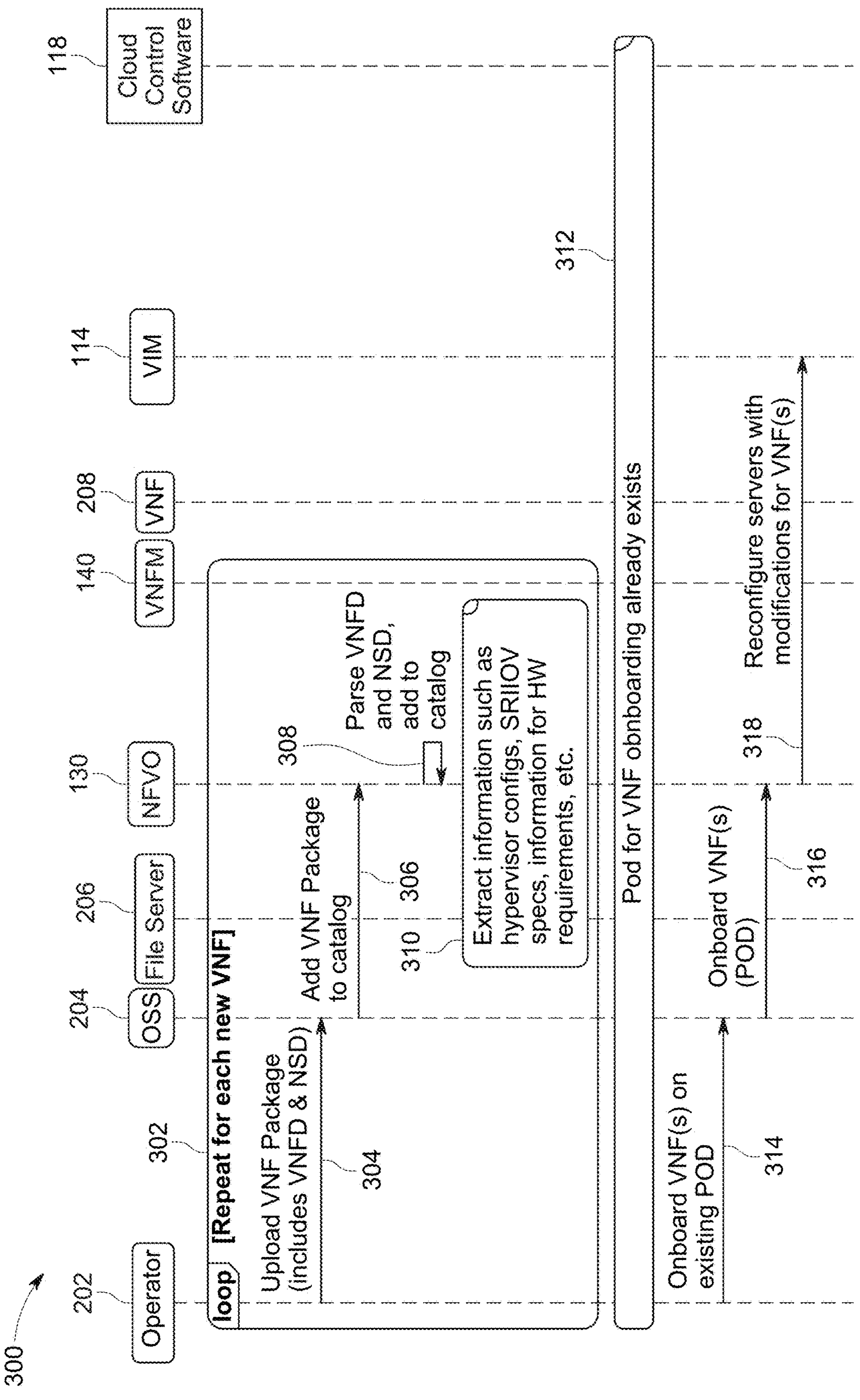
FIGS. 4A and 4B illustrate depicting a process for configuring cloud infrastructure resources to modify an existing POD entity on which to instantiate a virtual network function, according to an example embodiment.
Figure 4B:
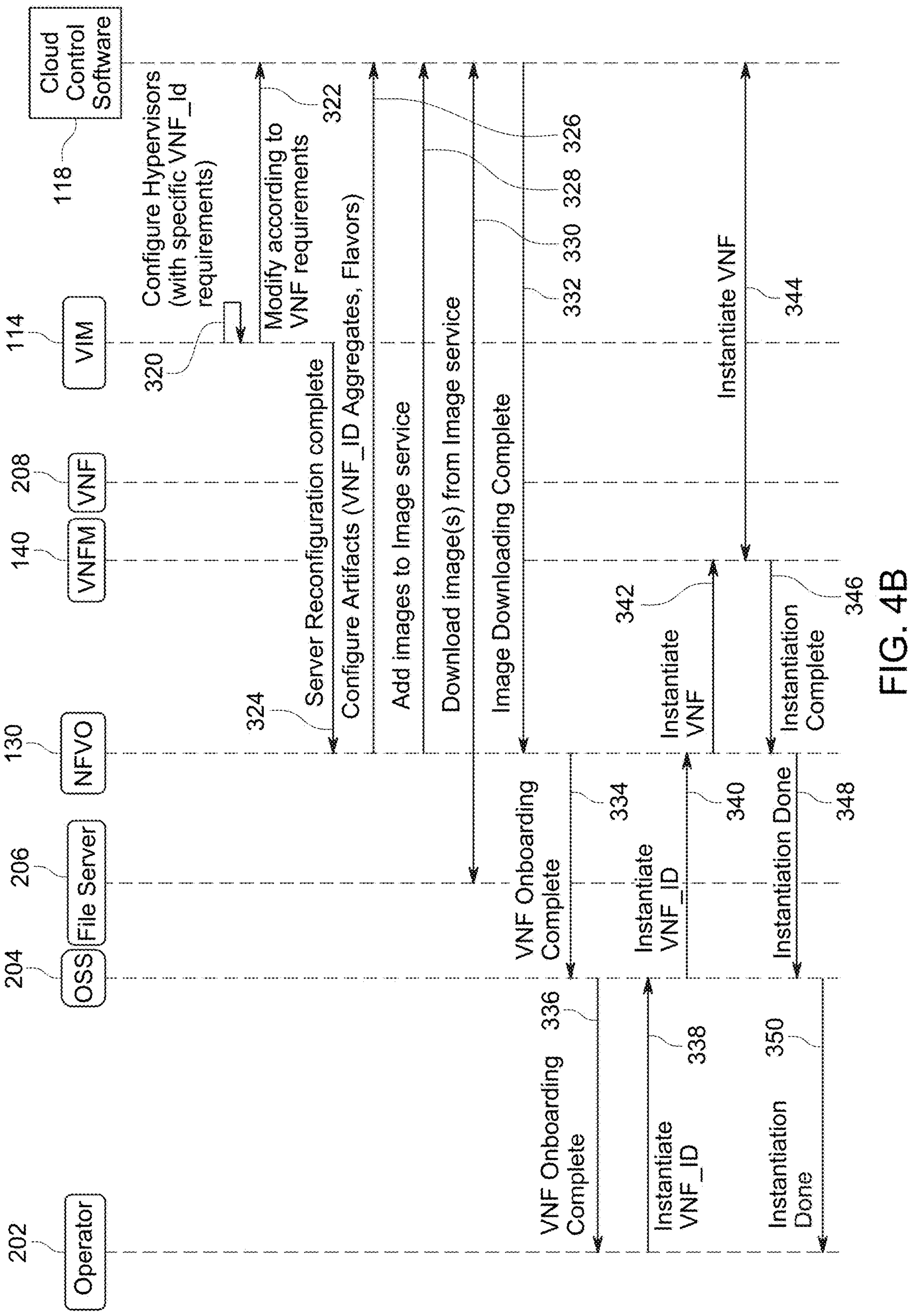

Reference is now made to FIGS. 4A and 4B for description of a process 300 used when a POD already exists and the POD is modified to enable certain VNFs to run on specific servers. A shown at 302, a loop is provided that includes several operations performed for each new VNF to be instantiated. At 304, the operator 202 uploads to the OSS 204 a VNF package that includes a VNFD and NSD. At 306, the OSS 204 adds the VNF to be added to a catalog at the NFVO 130. At 308, the NFVO 130 parses the VNFD and NSD, and they are added to a catalog at the NFVO 130. The NFVO 130, at 310, extracts from the VNFD and NSD information such as hypervisor configurations, SRIOV specifications, hardware requirements, etc. This would also include the vendor-specific enhanced resource information mentioned above.

As shown at 312, a POD for VNF onboarding already exists. Thus, in the process 300, instead of building a new POD, an existing POD is modified to accommodate the needs of the VNF to be on-boarded.

At 314, the operator 202 sends a command to the OSS 204 to onboard the VNF(s) to an existing POD. At 316, the OSS 204 sends a command to the NFVO 130 to onboard the VNF(s). The NFVO 130, at 318, sends a request to the VIM 114 to reconfigure one or more servers in the cloud computing infrastructure 110 according to the modifications for the VNF(s) to be on-boarded.

At 320, the VIM 114 configures the hypervisor(s) in a POD according to the specific requirements of the VNF(s) as specified by VNF_ID. The VIM 114, at 322, sends a request to the cloud control software 118 to make modifications according to the VNF requirements.

The VIM 114 reports back to the NFVO 130, at 324, when server reconfiguration is complete. Next, at 326, the NFVO 130, configures artifacts, e.g., OpenStack artifacts, for the VNF(s) on the cloud control software 118. At 328, the NFVO 130 sends a request to add images to the Image service, e.g., Glance of OpenStack, of the cloud control software 118. The NFVO 130 and cloud control software 118 then cooperate to download the image(s) from the Image service of the cloud control software 118. The cloud control software 118 notifies the NFVO 130 that image download is complete, at 332.

At 334, the NFVO 130 notifies the OSS 204 that VNF onboarding is complete. The OSS 204 then notifies the operator 202 that VNF onboarding is complete, at 336.

At 338, operator 202 requests the OSS 204 to instantiate the VNF corresponding to VNF_ID. The OSS 204, at 340, sends a request to the NFVO 130 to instantiate the VNF. The NFVO 130 sends a request, at 342, to the VNFM 140 to instantiate the VNF. The VNFM 140 then interacts with the cloud control software 118 to instantiate the VNF, at 344. The VNFM 140, at 346, notified the NFVO 130 that VNF instantiation is complete, and at 348, the NFVO 130 notifies the OSS 204 that instantiation is complete. The OSS 204 in turn notifies the operator 202 that instantiation is complete, at 350.

In summary, in the process 300 of FIGS. 4A and 4B, operations 302-310 involve the system taking in and parsing the VNFD and NSD associated with a VNF to be deployed in the cloud computing infrastructure 110, and operations 314-336 involve onboarding a VNF to an existing POD, where operations 318-336 involve making modifications to configurations of the cloud computing infrastructure 110 to accommodate the VNF. Operations 338-350 involve instantiating the VNF in the cloud computing infrastructure 110 once the POD has been modified and image downloaded.

Sample NSD

The following is an example of an NSD used to generate virtual Radio Access

Network (vRAN) in step 2 above.

```
tosca_definitions_version: tosca_simple_yaml_1_2
description: <vendor NSD compliant to (SOL001 v0.10.0)
imports:
  - etsi_nfv_so1001_nsd_2_5_1_types.yaml # all of NSD related
TOSCA types as defined in NFV SOL 001 GS
  - <vendor>_vDU.yaml
node_types:
  .1VDU.NS.1_0.1_0:
    derived_from: tosca.nodes.nfv.NS
    properties:
      descriptor_id:
        type: string
        constraints: [ equal: b1bbee7-ebca-4fa7-95ed-
4840d70a1177 ]
        default: b1bb0ee7-ebca-4fa7-95ed-4840d70a1177
      designer:
        type: string
        constraints: [ equal: ]
        default:
      name:
        type: string
        constraints: [ equal: VDUService ]
        default: VDUService
      version:
        type: string
        constraints: [ equal: '1.0' ]
        default: '1.0'
      invariant_id:
        type: string
        constraints: [ equal: 1122-2222-aaaa-bbbb ]
        default: 1122-2222-aaaa-bbbb
      flavour_id:
        type: string
        constraints: [ equal: simple ]
        default: simple
      project:
        type: map
        required: true
      quotas:
        type: map
        required: false
topology_template:
  substitution_mappings:
    node_type: <vendor>.1VDU.NS.1_0.1_0
    requirements:
      - virtual_link: [ du_nic0, virtual_link ]
      - virtual_link: [ du_nic1, virtual_link ]
      - virtual_link: [ du_nic2, virtual_link ]
      - virtual_link: [ du_nic3, virtual_link ]
  ##########
  # Nodes: #
  ##########
    node_templates:
      vDU_NS:
        type: <vendor>.1VDU.NS.1_0.1_0
        properties:
          project:
            name: vRAN
            username: <vendor>
            description: <vendor VRAN Project>
            roles: admin
```

-continued

```
        quotas:
          cores: −1
          RAM: −1
          instances: −1
          injected_flies: −1
          gigabytes: −1
    vDU:
      type: .1VDU.1_0.1_0
      properties: # This will conform to VnfProfile from the NSD
data types
        min _number_of_instances: 1
        max_number_of_instances: 4
```

Sample VNFD

The following is an example of an VNFD used in step 2 above.

```
    {
      "status": "Success", // Success or Failed
      "warnings": [
        {
          "line": "<vnfd__line_number>",
          "text": "<warning_text>"
        }
      ] ,
      "errors": [ // This will only be used if errors exist.
    Errors are always fatal
        {
          "line": "<vnfd_line_number>",
          "text": "<error_text>"
        }
      ],
      "vnf_data":
      {
        "vendor": "",
        "vnf": "<vendor>_vDU",
        "version": "1.0",
        "parser_version": "1.0",
        "project": {
          "name": "vran",
          "username": "<vendor>",
          "description": "<vendor> VRAN",
          "roles": admin
        },
        "quotas": {
          "cores": −1,
          "RAM": −1,
          "instances": −1,
          "injected_flies" : −1,
          "gigabytes": −1
        },
        "vnfc_list": [
          {
            "vnfc": "vdu_du",
            "max_instances": 1,
            "flavor":
            {
              "vcpus": 1,
              "vmem": "32 GB",
              "disk": 100, // Optional
              "ephemeral": 100, //Optional
              "swap": 1024, //Optional
              "rx-tx": 1, //Optional
              "cvim_specs":
              {
                "DISABLE_HYPERTHREADING": false,
                "VM_HUGEPAGE_PERCENTAGE": 100
              },
              "extra_specs":
              {
                "hw": {
                  "numa_nodes": 2,
                  "cpu_policy": "dedicated"
                },
                "xyz": true
              }
            },
```

-continued

```
            "image":
            {
              "name": "<vendor>-vdu",
              "disk_format": "qcow2",
              "container_format": "bare",
              "version": "1.0"
            },
            "storage":
            {
              "size": "100 GB",
              "type": "HDD"
            }
          }
        ],
        "aggregate_list": [ // Derive from placement_group
          { // Assumption scope for anti-affinity is NFVi-
node only
            "category": "xyz", // Required - use vnfc name
if placement_group missing
            "dedicated_availabilty_zone": true, // Optional
- false by default
            "min_hosts": 4, // Defaults to 1 if no placement
group
            "vnfcs": [
              "vdu_du"
            ]
          }
        ]
        "network_list": [
        {
          "type": "OVS",
          "provider_network": "Provider",
          "provider_network_type": "VLAN",
          "description": "du_nic0",
          "mtu": 9000,
          "ip-version": [
            "ipv6"
          ],
          "physical-networks": [
            {
              "phys_net": "physnet1"
            }
          ],
          "security-groups": [
            {
              "description": "description",
              "protocol": "tcp",
              "direction": "ingress",
              "ether_type": "ipv6",
              "port-range-min": 0,
              "port-range-max": 65535
            }
          ]
          "vnfcs": ["vdu_du"]
        },
        {
          "type": "SRI-OV",
          "provider_network": "Provider",
          "provider_network_type": "VLAN",
          "description": "du_nic1",
          "mtu": 9000,
          "ip-version": [
            "ipv6"
          ],
          "physical-networks": [
            {
              "phys_net": "phys_sriov0",
              "suffix": "0"
            },
            {
              "phys_net": "phys_sriov1",
              "suffix": "1"
            }
          ] ,
          "vnfcs": ["vdu_du"]
        },
```

-continued

```
{
  "type": "SRI-OV",
  "provider_network": "Provider",
  "provider_network_type": "VLAN",
  "description": "du_nic2",
  "mtu": 9000,
  "ip-version": [
    "ipv6"
  ] ,
  "physical-networks": [
    {
      "phys_net": "phys_sriov0",
      "suffix": "0"
    },
    {
      "phys_net": "phys_sriov1",
      "suffix": "1"
    }
  ],
  "vnfcs": ["vdu_du"]
},
{
  "type": "SRI-OV",
  "provider_network": "Provider",
  "provider_network_type": "VLAN",
  "description": "du_nic3",
  "mtu": 9000,
  "ip-version": [
    "ipv6"
  ] ,
  "physical-networks": [
    {
      "phys_net": "phys_sriov0",
      "suffix": "0"
    },
    {
      "phys_net": "phys_sriov1",
      "suffix": "1"
    }
  ] ,
  "vnfcs": ["vdu_du"]
}
]
}
}
```

VNF Build Requirements Translation into VIM Deployment Workflow

The following is an example of an Imagage_Onboarding file in Javascript Object Notation (JSON):

```
{
  "rmno:rmno": {
    "image": [
      {
        "container-format": "bare",
        "visibility": "public",
        "pod-deployment": [
          {
            "pod": "<POD name>"
          }
        ] ,
        "name": "<Image name created in glance>",
        "type": "<Image for what type of the VNF>",
        "uri": "URL of the image to download",
        "disk-format": "qcow2"
      }
    ]
  }
}
```

The following is an example of an Install_pod JSON file:

```
{
  "data": {
    "rmno:rmno ": {
      "pod": [
        {
          "name": "<POD name>",
          "address": "<OpenStack IP address>",
          "user": "<OpenStack User name>",
          "password": "<OpenStack password>",
          "location": "<POD location>",
          "managed-by-nfvo": "<Orchestrator which manages
this POD>",
          "managed-by-vnfm" : "<VNF manager which manages
this POD>",
          "project": "<OpenStack project>",
          "vnf-ids: "<VNF id>"
        }
      ]
    }
  }
}
```

The following is an example of a OpenStack_Artifacts_Onboarding JSON file:

```
{
  "rmno:rmno": {
    "project": [
      {
        "volume-type": "<volume type>",
        "pod-deployment": [
          {
            "pod": "<POD Name>"
          }
        ] ,
        "name": "<Project name>",
        "quota-set": [
      {
        "cores": "unlimited",
        "instances": "unlimited",
        "ram": "unlimited",
        "injected-files": "unlimited"
      }
    ] ,
    "user": [
      {
        "password": "<User password>",
        "roles": [
          "<Role name>"
        ] ,
        "name": "<User name>"
      }
    ]
  }
]
"aggregate": [
  {
    "metadata": [
      {
        "name": "<Meta data name>",
        "value": "<Meta data value>"
      }
    ] ,
    "pod-deployment": [
      {
        "pod": "<POD name>",
        "hosts": [
          "<Compute node name>"
        ]
      }
    ] ,
    "name": "<Host aggregate name>".
    "availability-zone": "<Zone name>"
  },
```

-continued

```
        {
          "metadata": [
            {
              "name": "<Meta data name>",
              "value": "<Meta data value>"
            }
          ] ,
          "pod-deployment": [
            {
              "pod": "<POD name>",
              "hosts": [
                "<Compute node name>"
              ]
            }
          ] ,
        "name": "<Host aggregate name>",
        "availability-zone": "<Zone name>"
      }
     ]
    "flavor": [
      {
        "disk": <Disk size>,
        "extra-specs": [
          {
            "name": "extra-specs name",
            "value": "extra-specs value"
          }
        ],
        "pod-deployment": [
          {
            "pod": "<Pod name>"
          }
        ] ,
        "name": "<Flavor name>",
        "vcpus": <Number of vCPU>,
        "ram": <Memory size>
      },
      {
        "disk": <Disk size>,
        "extra-specs": [
          {
            "name": "extra-specs name",
            "value": "extra-specs value"
          }
        ] ,
        "pod-deployment": [
          {
            "pod": "<POD name>"
          }
        ] ,
        "name": "<Flavor name>",
        "vcpus": <Number of vCPU>,
        "ram": <Memory size>
      }
     ]
    "network": {
        "provider-network-type": "<Provider network
type>",
        "subnet": [
          {
            "enable-dhcp": <True|False>,
            "name": "<Subnet name>",
            "cidr": "<Subnet CIDR>",
            "gateway": "<Gateway address>"
          }
        ],
        "provider-network": "<Physical provider
network name>",
        "pod-deployment": [
          {
            "pod": "<POD name>",
            "project": "<Project name>"
          }
        ],
        "name": "<Network name>",
        "provider-vlan-id" : <Vlan id>,
        "mtu": <MTU size>
      }
    }
```

-continued

```
          "security-group": {
            "pod-deployment": [
              {
                "pod": "<Pod name>",
                "project": "<Project
              }
            ],
            "name": "<Security group name>",
            "rules": [
              {
                "protocol": "<IP protocol>",
                "ether-type": "<Ether type>",
                "port-range-max": <Maximum port
range>,
                "name": "<Rule name>",
                "port-range-min": <Minimux port
range>,
                "remote-ip-prefix": "<Remote IP
prefix>",
                "direction": "<ingress|egress>"
              }
            ]
          }
        }
      }
    }
```

The following is an example of a VNF_instantiation_input JSON file:

```
{
  "data": {
    "rmno:rmno": {
      "network-service": {
        "deployment": [
          {
            "name": "Deployment name>",
            "type": "<Deployment Type>",
            "descriptor": "<NSD name>",
            "location": {
              "pod": "<POD name>",
              "project": "<Data center name>"
          },
          "domain": "<Domain name>",
          "network-function": [
            {
              "name": "<Network function name>",
              "type": "<VNF type>",
              "pod": "<POD name>",
              "instantiation-level": "<instantiation-level>",
              "deployment-flavor": "<deployment-flavor>",
              "hostname": "<host name>",
              "extra-parameters": [
                {
                  "name": "Extra parameter name",
                  "value": "Extra parameter value"
                }
              ] ,
              "connection-point": [
                {
                  "name": "<VNF connection point name>",
                  "ip": "Connection point IP>"
                  "register-in-dns": [
                    {
                      "dns-role": "<DNS role>",
                      "domain": "<Domain name to be registered
into DNS server>",
                      "hostname": "<Host name to be registered
into DNS server>"
                    }
                  }
                ] ,
                "unit": [
                  {
                    "hostname": "Host name",
                    "type": "<VNFC type>",
```

-continued

```
                "connection-point": [
                  {
                    "name": "VNFC connection point name",
                    "ip": "VNFC connection point IP"
                  }
                ]
              }
            ],
            "network": [
              {
                "type": "Network type",
                "extent": "external",
                "external-network": "Network name",
                "external-subnet": "Subnet name"
              }
            ]
          }
        ]
      }
    ]
  }
 }
}
}
```

Figure 5:
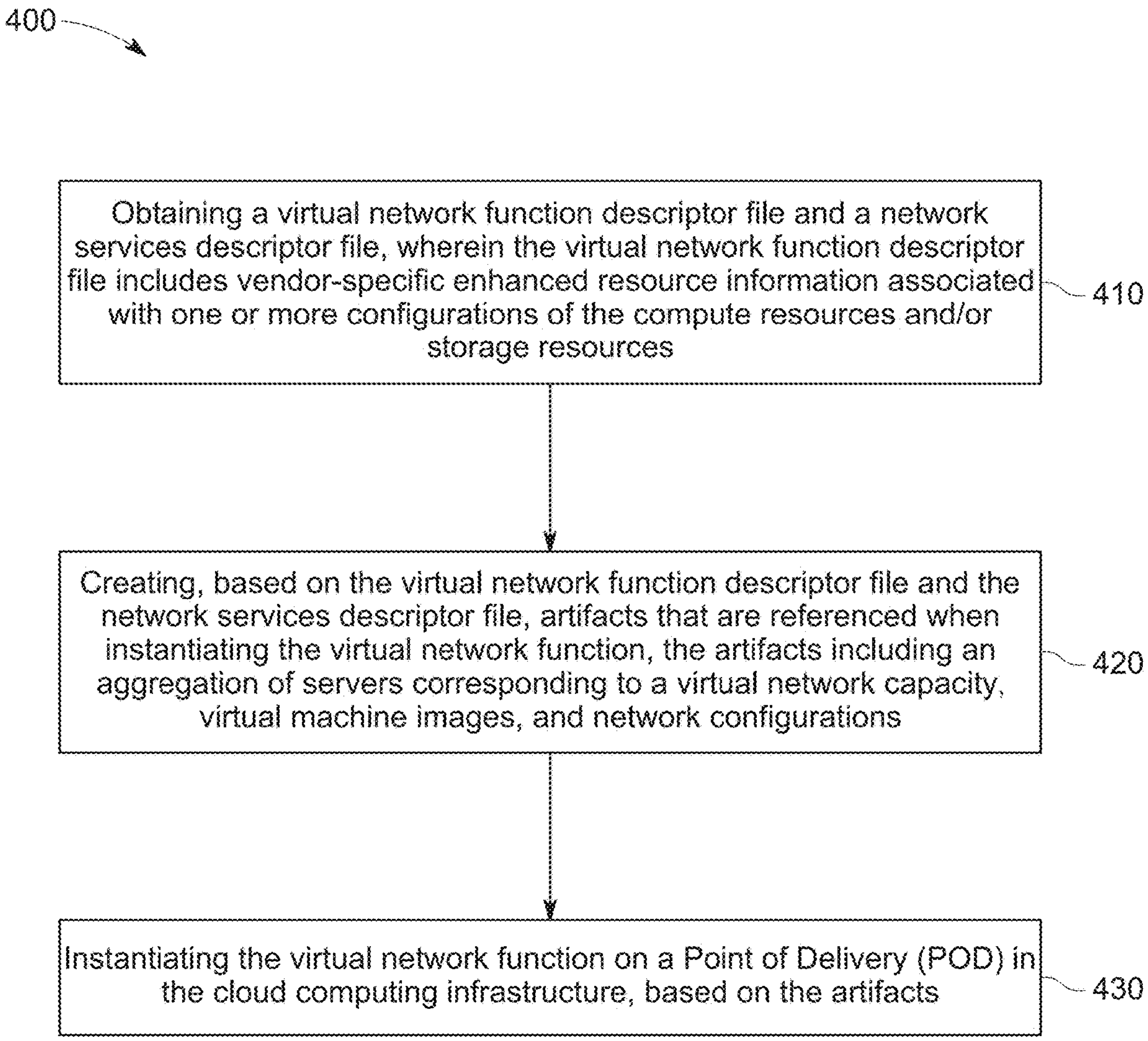
FIG. 5 is a flow chart for a method for configuring cloud infrastructure resources, according to an example embodiment.

Turning now to FIG. 5, a flow chart is provided that distills the operations depicted in FIGS. 2, 3A, 3B, 4A and 4B, to a process 400 that involves instantiating one or more virtual network functions in a cloud computing infrastructure that includes compute resources and storage resources, according to an example embodiment. The process 400 is performed by an orchestration entity that is configured to instantiate the one or more virtual network functions in a cloud computing infrastructure. At 410, the orchestration entity obtains a virtual network function descriptor file and a network services descriptor file. The virtual network function descriptor file describes parameters of a virtual network function to be instantiated in the cloud computing infrastructure. The network services descriptor file defines networking parameters to be supported in the cloud infrastructure. The virtual network function descriptor file includes vendor-specific enhanced resource information associated with one or more configurations of the compute resources and/or storage resources.

At 420, the orchestration entity creates, based on the virtual network function descriptor file and the network services descriptor file, artifacts that are referenced when instantiating the virtual network function, the artifacts including an aggregation of servers corresponding to a virtual network capacity, virtual machine images, and network configurations.

At 430, the orchestration entity instantiates the VNF on the POD in the cloud computing infrastructure, based on the artifacts.

As described above, the vendor-specific enhanced resource information may include support for one or more of: allocation of larger non-standard pages of memory (e.g., HugePage), hyperthreading, and hardware extensions (hardware acceleration needs), such as FGPA or GPU support.

Moreover, the vendor-specific enhanced resource information may specify a per-virtual network function capacity metric. In this case, the operation of creating the artifacts may include utilizing the per-virtual network function capacity metric to derive aggregate size and related characteristics of the cloud computing infrastructure.

As explained above in connection with FIGS. 2 and 4, the process 400 may involve, prior to operation 430 of instantiating a virtual network function on a POD, modifying an existing POD by reconfiguring one or more computing resources and a hypervisor.

Further still, the process 400 may further include operations of: validating the virtual network function to determine boundaries for one or more parameters of the virtual network function; performing planning of installation of the virtual network function, including evaluating the parameters of the virtual network function against available hardware and software resources in the cloud computing infrastructure and evaluating Internet Protocol (IP) addresses needed for data plane and control plane operation of the virtual network function against available IP addresses in the cloud computing infrastructure; generating cable rack and matrix information for building a POD or modifying an existing POD to support the virtual network function; and onboarding networking functions to the POD according to the network services definition file.

Presented herein are techniques by which SOL.001 VNFD extensions are specified to describe application requirements from the infrastructure (VIM details, extra specifications, etc.) These techniques may involve an extension of an NSD format in compliance with SOL.001 that allows for the following items to be specified:

Per-VNF capacity metric.

Project and Project Quotas

Further, these techniques provide for a method to utilize a capacity metric to derive aggregate size, as well a method to derive application specific infrastructure (Hypervisor kernel configuration, networks etc.) information by parsing SOL.001 VNFDs and NSDs for use as input parameters for VNF instantiation. Further still, a method is provided to generate rack and server build requirements, networking, configuration from VNFDs and NSDs as defined above. This information is used for building or customizing cloud infrastructures.

In summary, a system and method are provided to derive VNF infrastructure and networking requirements (such as SRIOV, HugePages, CPU pinning) from the VNFD and NSD definitions (extended) and thus produce a fully automated system for VIM creation and VNF onboarding—to prepare the infrastructure for VNF instantiation.

Figure 6:
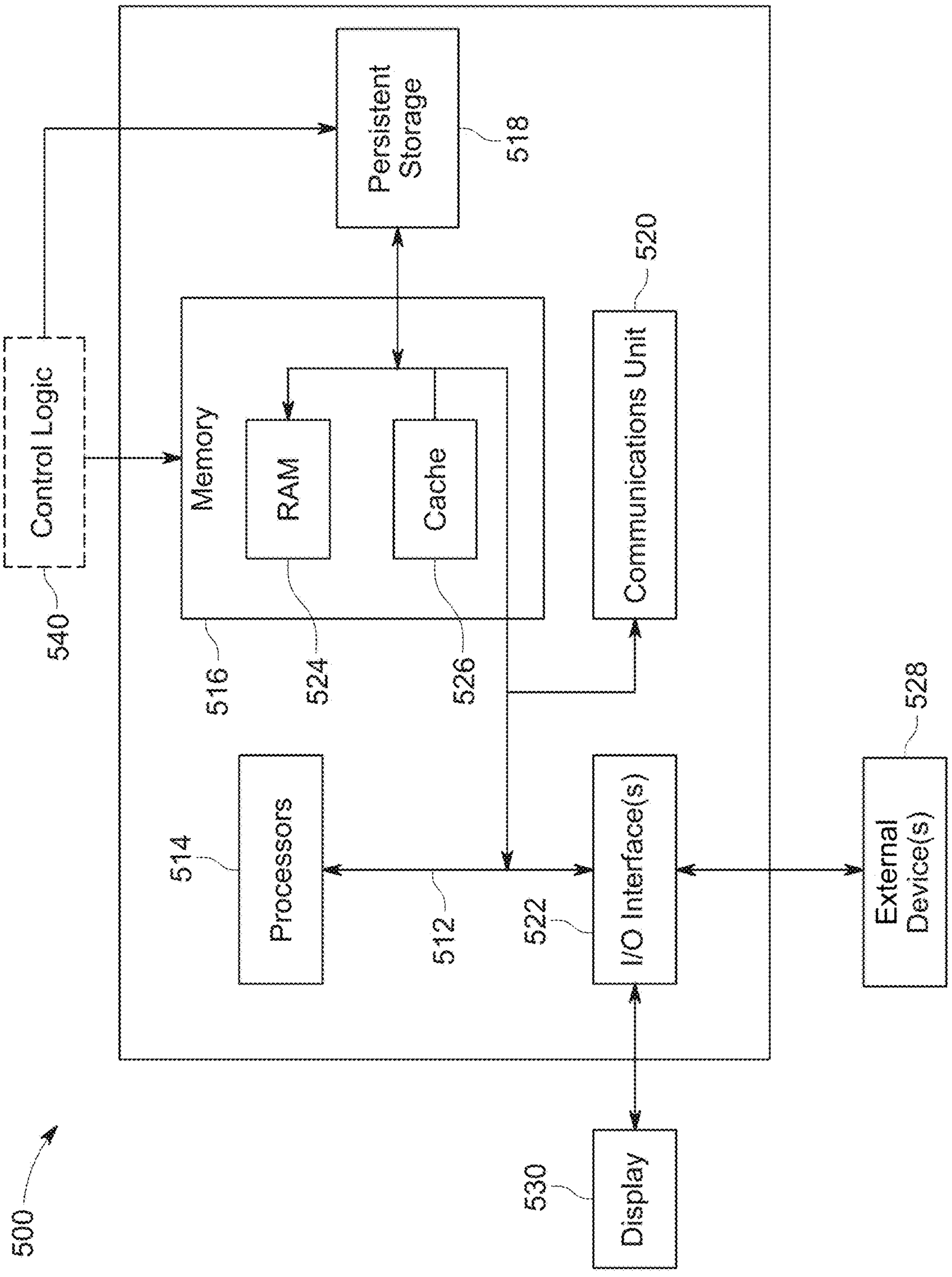
FIG. 6 is a hardware block diagram of a computing device that may perform functions associated with any combination of operations in connection with the techniques depicted in FIGS. 2, 3A, 3B, 4A, 4B and 5, according to an example embodiment.

FIG. 6 illustrates a hardware block diagram of a computing device 500 that may perform functions of any of the servers or computing or control entities referred to herein in connection with FIGS. 2, 3A, 3B, 4A, 4B, and 5, including, but not limited to, the VNFM, NFVO, VIM, and/or the like described herein. It should be appreciated that FIG. 6 provides only an illustration of one embodiment and does not imply any limitations with regard to the environments in which different embodiments may be implemented. Many modifications to the depicted environment may be made.

As depicted, the computing device 500 includes a bus 512, which provides communications between computer processor(s) 514, memory 516, persistent storage 518, at least one communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media, which can be inclusive on non-transitory computer readable storage media. In the depicted embodiment, memory 516, which may be inclusive of one or more memory element(s), includes random access memory (RAM) 524 and cache memory 526. In general, memory 516 can include any suitable volatile or non-volatile computer readable storage media. Instructions for control logic 540 may be stored in memory 516 and/or persistent storage 518 for execution by processor(s) 514. When the processor(s) 514 execute control logic 540 the processor(s) 514 are caused to perform operations (e.g., any operations described above in connection with FIGS. 2, 3A, 3B, 4A, 4B and 5).

One or more programs and/or other logic may be stored in persistent storage 518 for execution by one or more of the respective computer processors 514 via one or more memory element(s) of memory 516. The persistent storage 518 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems, networks, and/or devices. In these examples, each communications unit 520 may include at least one network interface (IF), which may facilitate communications with systems, networks, and/or devices utilizing any combination of hardware, software, etc. to facilitate one or more connections for communications discussed herein. Accordingly, communications unit 520 may provide communications through the use of any combination of physical and/or wireless communications links.

I/O interface(s) 522, which may be inclusive of one or more network interface cards (NICs), allows for input and output of data with other devices that may be connected to computing device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters', and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

In one form, a method is provided that is performed by an orchestration entity configured to instantiate one or more virtual network functions in a cloud computing infrastructure that includes compute resources and storage resources. The method includes: obtaining a virtual network function descriptor file that describes parameters of a virtual network function to be instantiated in the cloud computing infrastructure, and a network services descriptor file that defines networking parameters to be supported in the cloud computing infrastructure, wherein the virtual network function descriptor file includes vendor-specific enhanced resource information associated with one or more configurations of the compute resources and/or storage resources; creating, based on the virtual network function descriptor file and the network services descriptor file, artifacts that are referenced when instantiating the virtual network function, the artifacts including an aggregation of servers corresponding to a virtual network capacity, virtual machine images, and network configurations; and instantiating the virtual network function on a Point of Delivery (POD) in the cloud computing infrastructure, based on the artifacts.

In one form, the vendor-specific enhanced resource information includes support for allocation of larger non-standard pages of memory, and/or support for hyperthreading, and/or support for hardware extensions. The hardware extensions indicate requirements for support of a field programmable gate array (FPGA) and graphics processor unit (GPU).

In one form, the vendor-specific enhanced resource information specifies a per-virtual network function capacity metric.

The operation of creating the artifacts, may, in one form, include utilizing the per-virtual network function capacity metric to derive aggregate size and related characteristics of the cloud computing infrastructure.

In one form, the method may further include modifying an existing POD by reconfiguring one or more computing resources and a hypervisor.

In still another form, the method may include operations of: validating the virtual network function to determine boundaries for one or more parameters of the virtual network function; performing planning of installation of the virtual network function, including evaluating the parameters of the virtual network function against available hardware and software resources in the cloud computing infrastructure and evaluating Internet Protocol (IP) addresses needed for data plane and control plane operation of the virtual network function against available IP addresses in the cloud computing infrastructure; generating cable rack and matrix information for building a point of delivery (POD) or modifying an existing POD to support the virtual network function; and onboarding networking functions to the POD according to the network services definition file.

In another form, an apparatus is provided comprising: a communication interface configured to enable network communications including communications on behalf of an orchestration entity configured to instantiate one or more virtual network functions in a cloud computing infrastructure that includes compute resources and storage resources; at least one memory; at least one processor, wherein the at least one processor is configured to perform operations including: obtaining a virtual network function descriptor file that describes parameters of a virtual network function to be instantiated in the cloud computing infrastructure, and a network services descriptor file that defines networking parameters to be supported in the cloud computing infrastructure, wherein the virtual network function descriptor file includes vendor-specific enhanced resource information associated with one or more configurations of the compute resources and/or storage resources; creating, based on the virtual network function descriptor file and the network services descriptor file, artifacts that are referenced when instantiating the virtual network function, the artifacts including an aggregation of servers corresponding to a virtual network capacity, virtual machine images, and network configurations; and instantiating the virtual network function on a Point of Delivery (POD) in the cloud computing infrastructure, based on the artifacts.

In still another form, a system is provided comprising: a cloud computing infrastructure that includes compute resources and storage resources; and an orchestration entity configured to instantiate one or more virtual network functions in the cloud computing infrastructure, wherein the orchestration entity is configured to perform operations including: obtaining a virtual network function descriptor file that describes parameters of a virtual network function to be instantiated in the cloud computing infrastructure, and a network services descriptor file that defines networking parameters to be supported in the cloud computing infrastructure, wherein the virtual network function descriptor file includes vendor-specific enhanced resource information associated with one or more configurations of the compute resources and/or storage resources; creating, based on the virtual network function descriptor file and the network services descriptor file, artifacts that are referenced when instantiating the virtual network function, the artifacts including an aggregation of servers corresponding to a virtual network capacity, virtual machine images, and network configurations; and instantiating the virtual network function on a Point of Delivery (POD) in the cloud computing infrastructure, based on the artifacts.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:

at an orchestration entity configured to instantiate one or more virtual network functions in a cloud computing infrastructure that includes compute resources and storage resources:

obtaining a virtual network function descriptor file that describes parameters of a virtual network function to be instantiated in the cloud computing infrastructure, and a network services descriptor file that defines networking parameters to be supported in the cloud computing infrastructure, wherein the virtual network function descriptor file includes vendor-specific enhanced resource information associated with one or more configurations of the compute resources and/or storage resources and application configuration requirements for a hypervisor used by a Point of Delivery (POD) in the cloud computing infrastructure on which the virtual network function is instantiated, and wherein the virtual network function descriptor file includes a per-virtual network function capacity metric that indicates a number of users or processes the virtual network function can handle;

parsing the virtual network function descriptor file and the network services descriptor file to obtain infrastructure template information;

storing the infrastructure template information in an intermediate form;

creating, based on the infrastructure template information, artifacts that are referenced when instantiating the virtual network function, the artifacts including virtual machine images, network configurations, and an aggregation of servers that indicates a number of servers based on a number of virtual network functions determined based on the per-virtual network function capacity metric for the virtual network function; and instantiating the virtual network function on the POD in the cloud computing infrastructure, based on the artifacts.

2. The method of claim 1, wherein the vendor-specific enhanced resource information includes support for allocation of larger non-standard pages of memory.

3. The method of claim 1, wherein the vendor-specific enhanced resource information indicates support for hyper-threading.

4. The method of claim 1, wherein the vendor-specific enhanced resource information indicates support of hardware extensions.

5. The method of claim 4, wherein the hardware extensions indicate requirements for support of a field programmable gate array (FPGA) and graphics processor unit (GPU).

6. The method of claim 1, wherein the vendor-specific enhanced resource information specifies the per-virtual network function capacity metric.

7. The method of claim 6, wherein creating the artifacts includes utilizing the per-virtual network function capacity metric to derive aggregate size and related characteristics of the cloud computing infrastructure.

8. The method of claim 1, further comprising modifying an existing POD by reconfiguring one or more computing resources and the hypervisor.

9. The method of claim 1, further comprising:

validating the virtual network function to determine boundaries for one or more parameters of the virtual network function;

performing planning of installation of the virtual network function, including evaluating the parameters of the virtual network function against available hardware and software resources in the cloud computing infrastructure and evaluating Internet Protocol (IP) addresses needed for data plane and control plane operation of the virtual network function against available IP addresses in the cloud computing infrastructure;

generating cable rack and matrix information for building a point of delivery (POD) or modifying an existing POD to support the virtual network function; and onboarding networking functions to the POD according to the network services descriptor file.

10. An apparatus comprising:

a communication interface configured to enable network communications including communications on behalf of an orchestration entity configured to instantiate one or more virtual network functions in a cloud computing infrastructure that includes compute resources and storage resources;

at least one memory; and at least one processor, wherein the at least one processor is configured to perform operations including:

obtaining a virtual network function descriptor file that describes parameters of a virtual network function to be instantiated in the cloud computing infrastructure, and a network services descriptor file that defines networking parameters to be supported in the cloud computing infrastructure, wherein the virtual network function descriptor file includes vendor-specific enhanced resource information associated with one or more configurations of the compute resources and/or storage resources and application configuration requirements for a hypervisor used by a Point of Delivery (POD) in the cloud computing infrastructure on which the virtual network function is instantiated, and wherein the virtual network function descriptor file includes a per-virtual network function capacity metric that indicates a number of users or processes the virtual network function can handle;

parsing the virtual network function descriptor file and the network services descriptor file to obtain infrastructure template information;

storing the infrastructure template information in an intermediate form;

creating, based on the infrastructure template information, artifacts that are referenced when instantiating the virtual network function, the artifacts including virtual machine images, network configurations, and an aggregation of servers that indicates a number of servers based on a number of virtual network functions determined based on the per-virtual network function capacity metric for the virtual network function; and instantiating the virtual network function on the POD in the cloud computing infrastructure, based on the artifacts.

11. The apparatus of claim 10, wherein the vendor-specific enhanced resource information includes support for one or more of: allocation of larger non-standard pages of memory, hyperthreading, or hardware extensions.

12. The apparatus of claim 11, wherein the hardware extensions indicate requirements for support of a field programmable gate array (FPGA) and graphics processor unit (GPU).

13. The apparatus of claim 10, wherein the vendor-specific enhanced resource information specifies the per-virtual network function capacity metric.

14. The apparatus of claim 13, wherein the at least one processor is configured to perform creating the artifacts by utilizing the per-virtual network function capacity metric to derive aggregate size and related characteristics of the cloud computing infrastructure.

15. The apparatus of claim 10, wherein the at least one processor is further configured to perform modifying an existing POD by reconfiguring one or more computing resources and the hypervisor.

16. A system comprising:

a cloud computing infrastructure that includes compute resources and storage resources; and an orchestration entity that includes a memory and a computer processor configured to instantiate one or more virtual network functions in the cloud computing infrastructure, wherein the orchestration entity is configured to perform operations including:

obtaining a virtual network function descriptor file that describes parameters of a virtual network function to be instantiated in the cloud computing infrastructure, and a network services descriptor file that defines networking parameters to be supported in the cloud computing infrastructure, wherein the virtual network function descriptor file includes vendor-specific enhanced resource information associated with one or more configurations of the compute resources and/or storage resources and application configuration requirements for a hypervisor used by a Point of Delivery (POD) in the cloud computing infrastructure on which the virtual network function is instantiated, and wherein the virtual network function descriptor file includes a per-virtual network function capacity metric that indicates a number of users or processes the virtual network function can handle;

parsing the virtual network function descriptor file and the network services descriptor file to obtain infrastructure template information;

storing the infrastructure template information in an intermediate form;

creating, based on the infrastructure template information, artifacts that are referenced when instantiating the virtual network function, the artifacts including virtual machine images, network configurations, and an aggregation of servers that indicates a number of servers based on a number of virtual network functions determined based on the per-virtual network function capacity metric for the virtual network function; and instantiating the virtual network function on the POD in the cloud computing infrastructure, based on the artifacts.

17. The system of claim 16, wherein the vendor-specific enhanced resource information includes support for one or more of: allocation of larger non-standard pages of memory, hyperthreading, or hardware extensions.

18. The system of claim 17, wherein the hardware extensions indicate requirements for support of a field programmable gate array (FPGA) and graphics processor unit (GPU).

19. The system of claim 16, wherein the orchestration entity is further configured to perform creating the artifacts by utilizing the per-virtual network function capacity metric to derive aggregate size and related characteristics of the cloud computing infrastructure.

20. The system of claim 16, wherein the orchestration entity is further configured to perform modifying an existing POD by reconfiguring one or more computing resources and the hypervisor.

* * * * *